United States Patent [19]
Schmidt et al.

[11] 3,807,837
[45] Apr. 30, 1974

[54] COMBINATION OF DOUBLY REFRACTING PRISMS

[75] Inventors: Uwe Schmidt, Pinneberg, Holstein; Walter Thust, Hamburg-Niendorf, both of Germany

[73] Assignee: U.S. Philips Corporation, New York, N.Y.

[22] Filed: Nov. 13, 1970

[21] Appl. No.: 89,458

Related U.S. Application Data

[63] Continuation of Ser. No. 756,744, Sept. 3, 1968, abandoned.

[30] Foreign Application Priority Data

Sept. 5, 1967  Germany.............................. 42939

[52] U.S. Cl.................. 350/286, 350/147, 350/157
[51] Int. Cl. ............................................... G02b 5/04
[58] Field of Search ........... 350/157, 160, 147, 286, 350/287

[56] References Cited
UNITED STATES PATENTS

| | | | |
|---|---|---|---|
| 1,936,953 | 11/1933 | Richter | 350/157 |
| 3,458,247 | 7/1969 | Buhrer | 350/157 |
| 3,450,460 | 6/1969 | Brown | 350/286 |
| 3,274,881 | 9/1966 | Sauer | 350/157 |

OTHER PUBLICATIONS

U. J. Schmidt, "A High Speed Digital Light Beam Deflector," Oct. 1964, Physics Letters, Vol. 12, No. 3, pp. 205, 206.

*Primary Examiner*—Ronald L. Wibert
*Assistant Examiner*—Michael J. Tokar
*Attorney, Agent, or Firm*—Frank R. Trifari; Simon L. Cohen

[57] ABSTRACT

A compound prism having an even number of doubly refracting component prisms having equal or substantially equal refracting angles. The component prisms are arranged one behind another so that for each face inclined to the axis of the system, there is a second face whose inclination to the axis of the system is opposite to that of the first face, the angles of inclination being equal to each other. The refracting angles are turned in regular order of succession through 180° relative to each other and to the axis of the system so that a light ray traverses the prism portions alternately as an ordinary and as an extraordinary ray.

4 Claims, 4 Drawing Figures

INVENTORS
UWE SCHMIDT
WALTER THUST
BY
AGENT

COMBINATION OF DOUBLY REFRACTING PRISMS

This application is a continuation of Ser. No. 756,744 filed Sept. 3, 1968, and now abandoned.

The invention relates to a combination of doubly refracting sequentially arranged prisms.

Such a combination is known. It is furthermore known that by virtue of the law of refraction the angular aberration of a prism has two aspects. In the first place, with a constant angle of incidence the value of the deviation varies less in proportion to the refracting angle according as the latter increases (so-called refracting-angle aberration). In the second place with a constant refracting angle the value of the deviation varies the more with the angle of incidence, the further this angle differs from the angle of incidence with a symmetrical passage of the light ray (so-called incident-angle aberration).

Prisms of doubly refracting materials exhibiting a high degree of correction the angular aberration may be employed in digital light deflection devices for various purposes. As long as the refracting angles of such prisms are small, the two kinds of angular aberration are in general so small that single prisms are sufficient. However, if prisms having larger refracting angles are required, it may be necessary to reduce the angular aberrations involved by using a combination of prisms.

It should be noted that digital light deflection devices are formed by a sequence of alternating doubly refracting prisms and polarization switches. By actuating these polarization switches a suitably plane-polarized light beam can be deflected in a direction selected from a given number of directions. In some uses of a digital light deflection device it is necessary that the selectable directions should exhibit the same relative angular distances within given error limits. This requirement implies that the incident-angle aberration of doubly refracting prisms should not exceed a given value. A constant incident-angle aberration might be allowed, since its effect would be identical with that of a lens so that it could be corrected by known means. A refracting-angle aberration can always be corrected by a suitable choice of the refracting-angle insofar as this is possible, for example, from the manufacturing point of view.

For solving this problem a prism structure comprising sequentially arranged prisms having different refracting-angles has been proposed, in which the angular aberrations occurring in single prisms can be reduced.

An object of the invention is to provide a further improved correction of the angular aberrations with the use of a smaller number of prism elements.

According to the invention this is achieved by forming the compound prism from an even number of doubly refracting component prisms having equal or substantially equal refracting-angles, which prisms are arranged one behind the other so that for each face inclined to the axis of the system there is provided a second face whose inclination to the axis of the system is opposite to that of the first face, that the angles of inclination are equal to each other, and that the refracting-angles are turned in regular order of succession through 180° relatively to each other and to the axis of the system, a light ray traversing the prism portions alternately as an ordinary and as an extraordinary ray.

The invention will be described with reference to the drawing, in which

FIG. 3 shows a compound prism and FIG. 2a shows the prisms separated and in perspective so that their optic axes can be seen, consisting of four right-angled prisms

Figure 1:
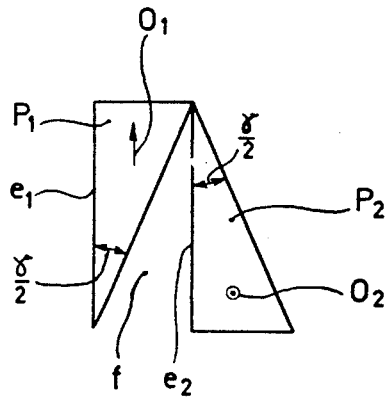
FIG. 1 shows a compound prism consisting of two right-angled prisms.

With the compound prism shown in FIG. 1 the plane of incidence $e_1$ of the first prism $P_1$ is at right angles to the axis of the system. As is shown in the Figure, the optic axis $O_1$ of this crystal is at right angles to the refracting edge and at right angles to the axis of the system. The face of incidence $e_2$ of the second prism $P_2$ is parallel to that of the first prism, but the prism is turned upside down, which means that its refracting-angle $\gamma/2$ is turned through 180° about the axis of the system with respect to that of the first prism $P_1$. The direction of the optic axis $O_2$ of the prism $P_2$ is at right angles to that of the first prism $P_1$. The "free" space $f$ between the prisms $P_1$ and $P_2$ is filled with a homogeneous isotropic material the refractive index of which is preferably the arithmetic average of the refractive indices of the doubly refracting material.

Figure 2:
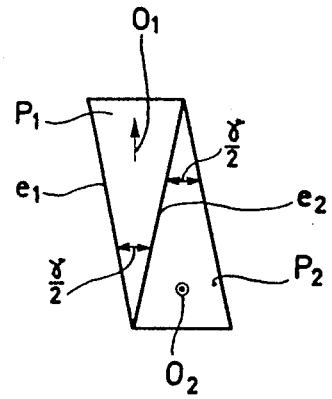
FIG. 2 shows a compound prism consisting of two acute-angled prisms.

FIG. 2 shows a further embodiment of the prism according to the invention. This embodiment is distinguished from the former in that the face of incidence $e_1$ and the face of incidence $e_2$ of the prisms $P_1$ and $P_2$ respectively are equally inclined to the axis of the system instead of being normal thereto, i.e. acute-angled prisms are used. The angles of inclination of all faces are equal to each other. In FIG. 2a the prisms are shown separated so that the optic axes $O_1$ and $O_2$ which form angles $\beta_1$ and $\beta_2$ respectively with the refracting edges of the crystals of 45° can be seen.

The prisms according to the invention are better than the constructions hitherto known, since a prism of the kind shown in FIG. 1 or one of the kind shown in FIG. 2 has a considerably smaller incident-angle aberration, while, in addition, a prism as shown in FIG. 1 exhibits a particularly small difference between the incident-angle aberration of ordinary and of extraordinary rays, while a prism as shown in FIG. 2 has a particularly small refracting-angle aberration.

Figure 3:
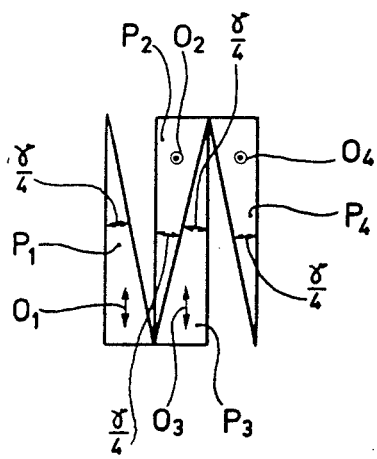
Figure 4:
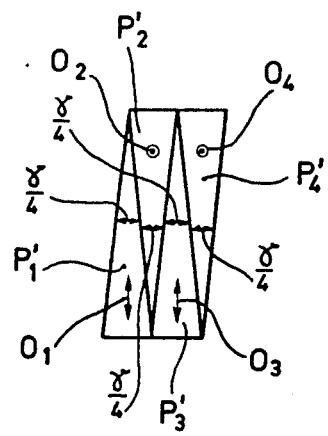
FIG. 4 shows a compound prism consisting of four acute-angled prisms.

The aberrations may be further reduced by using more than two component prisms. Although the use of three component prisms will further reduce the refracting-angle aberration — such a combination would have a smaller refracting-angle aberration than the known combination of Soref and MacMahon — an improvement of the incident-angle aberration is obtained only by using four component prisms. Two embodiments thereof are shown in FIGS. 3 and 4. The four prisms $P_1$ to $P_4$, each having a refracting angle $\gamma/4$, are arranged one behind the other, the optic axes $O_1$ to $O_4$ being turned each through 90° with respect to the adjacent axes.

The invention is not restricted to the case in which the optic axes are orientated as is shown in FIGS. 1 to 4. Provided that the optic axes of a prism structure are normal and parallel to each other, these axes may also be turned together about the axis of the system while maintaining the correction or improvement of the angular aberrations.

What is claimed is:

1. A combination of doubly refracting sequentially arranged prisms, comprising a plurality of pairs of doubly refracting prisms having equal refracting angles, one prism of each pair having a face inclined to a given axis of the combination, the other prism of each pair having a face inclined to a given axis of the combination by an angle equal an opposite the angle of inclination of the first prism of each pair, each successive prism of the combination having a refracting angle rotated 180° about the axis of the combination with respect to the refracting angle of the preceding prism, each prism in each pair of prisms having an optic axis orthogonally oriented with respect to the given axis of the combination and at right angles to the optic axis of the corresponding other prism in each pair, whereby a light ray traverses the component prisms alternately as an ordinary and as an extraordinary ray.

2. A combination as claimed in claim 1, wherein the optic axis of the component prisms are at an angle of 45° to their refracting edges.

3. A combination as claimed in claim 1, wherein the optic axis of the component prisms are alternately parallel and normal respectively to their refracting edges.

4. A combination as claimed in claim 3, wherein the combination of prisms is accommodated in an isotropic, homogeneous medium whose refractive index is as near as possible to the refractive indices of the component prisms.

* * * * *

PO-1050
(5/69)

UNITED STATES PATENT OFFICE
CERTIFICATE OF CORRECTION

Patent No. 3,807,837    Dated April 30, 1974

Inventor(s) UWE SCHMIDT and WALTER THUST

It is certified that error appears in the above-identified patent and that said Letters Patent are hereby corrected as shown below:

IN THE DRAWING

Insert Fig. 2a in the drawings where appropriate (copy attached).

ON THE TITLE PAGE

"[30]  Foreign Application Priority Data

Sept. 5, 1967    Germany.................42939"

should read:

--[30]  Foreign Application Priority Data

Sept. 5, 1967    Germany.................P.42939--;

IN THE SPECIFICATION

IN THE CLAIMS

Claim 1, line 7, "an" second occurence should be --and--;

Signed and sealed this 11th day of March 1975.

(SEAL)
Attest:

RUTH C. MASON
Attesting Officer

C. MARSHALL DANN
Commissioner of Patents
and Trademarks